(12) United States Patent
Brobst et al.

(10) Patent No.: US 6,687,708 B1
(45) Date of Patent: Feb. 3, 2004

(54) OBJECT-ORIENTED FRAMEWORK FOR TRACKING COLLECTION DOCUMENTS

(75) Inventors: Curtis H. Brobst, Rochester, MN (US); James E. Carey, Rochester, MN (US); Verena Kranzl, Vienna (AT); Stephen Porter, Oldham (GB); Siegfried Wiesenhofer, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,316

(22) Filed: Aug. 31, 1999

(51) Int. Cl.$^7$ .............................................. G06F 13/30
(52) U.S. Cl. ........................ 707/103 Y; 717/1; 705/35; 705/34
(58) Field of Search .................. 705/34, 35; 717/1; 707/102, 103, 103 R, 103 Y, 103 Z, 104.1

(56) References Cited

U.S. PATENT DOCUMENTS

| | | | | |
|---|---|---|---|---|
| 5,740,427 A | * | 4/1998 | Stoller ........................... | 705/30 |
| 6,041,312 A | * | 3/2000 | Bickerton et al. ............. | 705/30 |
| 6,047,267 A | * | 4/2000 | Owens et al. .................. | 705/34 |
| 6,070,150 A | * | 5/2000 | Remington et al. ............ | 705/34 |
| 6,070,152 A | * | 5/2000 | Carey et al. ................... | 705/35 |
| 6,081,790 A | * | 6/2000 | Rosen ............................ | 705/40 |
| 6,092,055 A | * | 7/2000 | Owens et al. .................. | 705/34 |
| 6,092,075 A | * | 7/2000 | Carey et al. ................... | 707/102 |
| 6,106,569 A | * | 8/2000 | Bohrer et al. .................. | 717/1 |
| 6,173,439 B1 | * | 1/2001 | Carlson et al. ................ | 717/1 |

FOREIGN PATENT DOCUMENTS

| | | | | |
|---|---|---|---|---|
| JP | 58-189759 | * | 11/1993 | ................... 705/35 |

* cited by examiner

Primary Examiner—Richard Chilcot
(74) Attorney, Agent, or Firm—Schmeiser, Olsen & Watts, LLP

(57) ABSTRACT

An extensible Object-Oriented (OO) framework in an object-oriented programming system defines objects and classes used to correspond to and track a collection document. The collection document can be an accounts receivable (the debt is to be received) or an accounts payable (the debt is to be paid) collection document. A collection document is an unconditional order in writing in which a debtor promises to pay a debt to a bearer in exchange for at least one benefit that has been or will be received by the debtor. The OO framework defines a collection document object that corresponds to and tracks a collection document through its many states until the collection document finally ends in an ending state. Even then, the collection document object may be retained (e.g., in a persistent or frozen state) for future reference. Each of the states of the collection document object corresponds to one of the states of the collection document.

29 Claims, 5 Drawing Sheets

OBJECT-ORIENTED FRAMEWORK FOR TRACKING COLLECTION DOCUMENTS

RELATED APPLICATION

This application is related to the following commonly assigned, copending patent application, which is incorporated herein by reference:

Ser. No. 09/038,024, filed Mar. 11, 1998, entitled "A METHOD OF DEVELOPING A SOFTWARE SYSTEM USING OBJECT ORIENTED TECHNOLOGY", by Kabohrer, et al.

FIELD OF THE INVENTION

The present invention relates, in general, to computers that support an object-oriented environment. More specifically, the present invention relates to an object-oriented framework that supports collection documents.

BACKGROUND OF THE INVENTION

A collection document is a fiduciary instrument that is much like an "I Owe You" in that one company or person promises to pay another person at a later date for goods or services. These documents are also called "promissory notes" or "bills of exchange." Although not used very often in the United States, collection documents are popular overseas, particularly in England, Italy, and France. The typical situation in which a collection document arises is when one company would like to receive a benefit now but pay for the benefit sometime in the future. The benefit is usually goods or services. If another company (the "drawee") gives the benefit to the first company, the first company (the "drawer"), in return, gives the drawee a collection document that promises payment of the debt sometime in the future. When the time for payment comes, the drawer pays the drawee the debt, which is usually money, although it could be goods or services.

One of the problems with collection documents is that they are an accounting nightmare. The transaction just described is the simplest, best possible situation for a collection document. In general, normal collection documents can proceed through a myriad of other possible situations.

For instance, if the drawee (the company that has given the benefit and received the collection document) runs into financial trouble, the drawee might sell the collection document to a bank or a third party for a reduced price. On the other hand, the drawer (the company that has received the benefit and has given the collection document) might not be able to pay or may only be able to partially pay its debt. In addition, there will be a number of other states that the collection document might be in, and these states must be tracked.

Furthermore, all of the data associated with a collection document, such as who is the drawee, how much is owed, the type of payment (e.g., money, goods, services), the date of payment, etc., must all be tracked and stored.

Lastly, many of the states and attributes associated with a collection document must be allowed to change. For instance, one company may not wish to sell their collection documents to a third party. Or, another company may not need as much information to track the collection documents as another company needs. Still other companies might wish to use only accounts receivable collection documents and not accounts payable collection documents.

What is needed is a system that allows all of the information and states associated with a collection document to be tracked, while still allowing users of a collection document to customize collection documents for their own uses.

SUMMARY OF THE INVENTION

According to the present invention, an extensible Object-Oriented (OO) framework in an object-oriented programming system defines objects and classes used to correspond to and track a collection document. The collection document can be an accounts receivable (the debt is to be received) or an accounts payable (the debt is to be paid) collection document. A collection document is an unconditional order in writing in which a debtor promises to pay a debt to a bearer in exchange for at least one benefit that has been or will be received by the debtor. The OO framework defines a collection document object that corresponds to and tracks a collection document through its many states until the collection document finally ends in an ending state. Even then, the collection document object may be retained (e.g., in a persistent or frozen state) for future reference. Each state of the collection document object corresponds to a state of the collection document.

The framework includes core classes whose inner programming cannot be changed and classes for which it is anticipated extension of the classes with new attributes and methods will occur. A program developer can customize the extensible classes to meet the needs of any application that needs to track collection documents. It is recommended that, if new attributes are desired, the extensible portion of the collection document be subclassed. In the most preferred embodiment of the present invention, the collection document object has a number of allowed states. Each state is arrived at or left through a transition. In the most preferred embodiment, the transitions themselves are extensible in that new transitions can be added, current transitions can be removed, or current transitions can be changed. By eliminating or adding transitions, states may be removed or added. Thus, not only can traditional subclassing be used to extend the functionality of the current invention, but changing transitions can also change functionality.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements, and.

DETAILED DESCRIPTION OF THE PREFERRED EMBODIMENTS

Overview—Object-Oriented Technology

Figure 1:
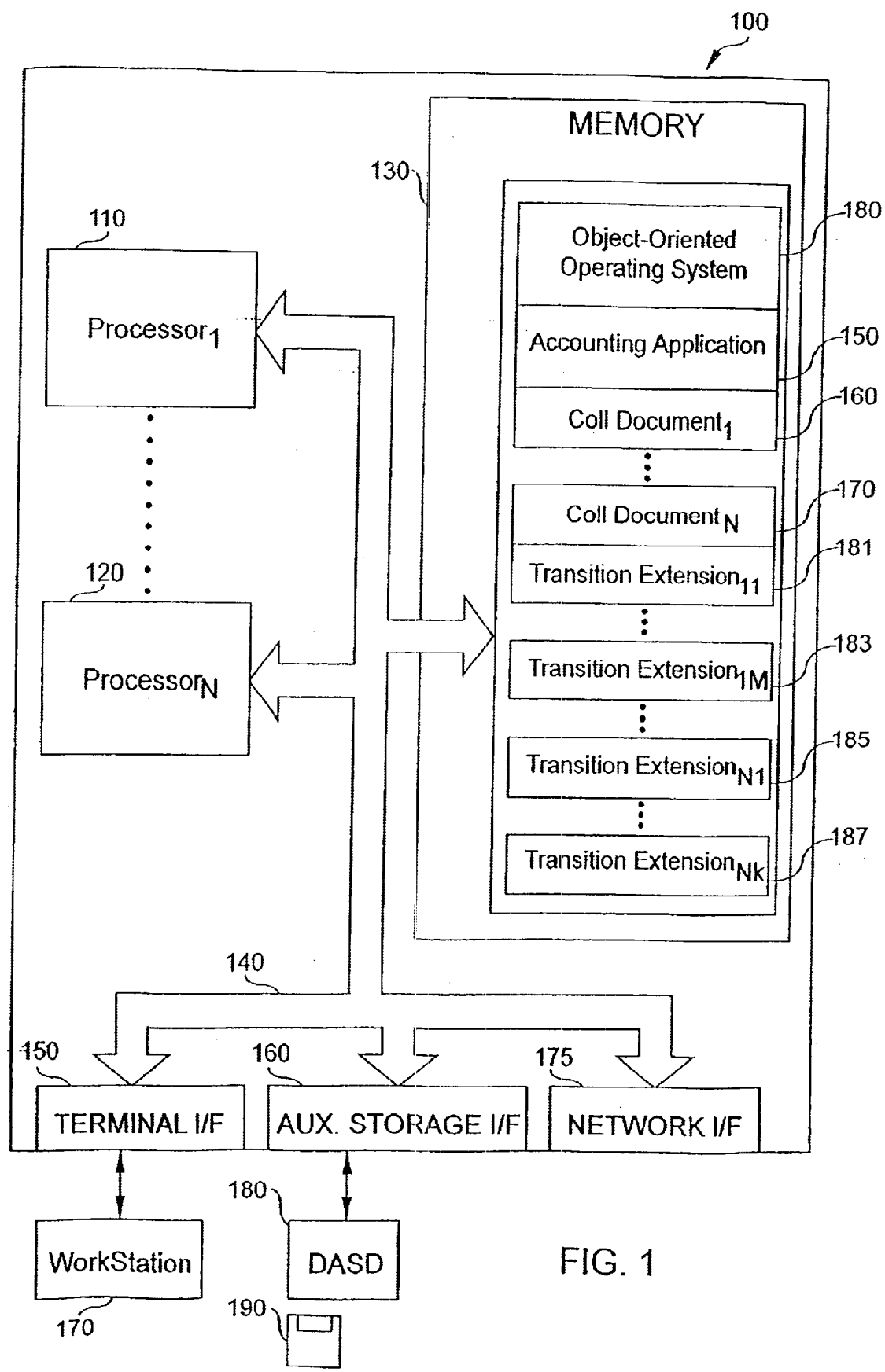
FIG. 1 is a block diagram of a computer system supporting an object-oriented environment in accordance with a preferred embodiment of the present invention.

The present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework, the reader should take care to ensure that the comparison is indeed "apples to apples." As will become more clear in the forthcoming paragraphs, the term framework is used in this specification to describe an OO mechanism that has been designed to have core functionality and extensible functionality. The core functionality is that part of the framework that is not subject to modification by the framework purchaser. The extensible functionality, on the other hand, is that part of the framework that has been explicitly designed to be customized and extended by the framework purchaser. Core functionality and extensible functionality will be discussed in terms of the preferred embodiments of the present invention.

OO Frameworks

While in general terms an OO framework can be properly characterized as an OO solution, there is nevertheless a fundamental difference between a framework and a basic OO solution. The difference is that frameworks are designed in a way that permits and promotes customization and extension of certain aspects of the solution. In other words, frameworks amount to more than just a solution to the problem. The mechanisms provide a living solution that can be customized and extended to address individualized requirements that change over time. Of course, the customization/extension quality of frameworks is extremely valuable to framework consumers because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization by the framework consumer) and the extensible function of the framework (i.e., that part of the framework that is to be subject to potential customization). In the end, the ultimate worth of a framework rests not only on the quality of the object design, but also on the design choices involving which aspects of the framework represent core functions and which aspects represent extensible functions.

Terminology

Because terminology is an important aspect of the current invention, terminology will be discussed now. The term "collection document" equates with different terms, depending on the location in the world where these financial instruments are being used. A collection document may be characterized as both of the following terms, or as the more complete definition given below:

Bill of Exchange: an unconditional order in writing, signed and addressed by one person (the drawer) to another (the drawee), requiring the drawee to pay a specified sum of money to a third person (the payee) on demand, or at a determinable or fixed future date. On accepting a bill of exchange, the drawee becomes the party primarily responsible for paying it. The check is the most common type of bill of exchange. The term "sum of money" may be replaced by "debt," as the drawer may pay the payee goods and services. In general, money will be paid by the drawer to the payee, but goods and services are allowed as payment. The bill of exchange is made primarily in consideration for a benefit, such as goods or services, although anything that can stand for consideration (such as a promise not to sue) may suffice for the current invention.

Promissory Note: a written instrument containing an unconditional promise by a party (the drawer) who signs the instrument to pay a definite sum of money to another party (the payee) either on demand or at a specified date. A promissory note differs from an IOU in that the former is a promise to pay and the latter is a mere acknowledgment of a debt.

The term "collection document" covers both of these situations in addition to those disclosed below. To reduce confusion, terms other than "drawee," "drawer" and "payee" will be used herein. One source of confusion that should be eliminated by the terms used herein concerns the terms "drawer" and "drawee." In a "normal" collection document, the person creating the collection document—the drawee—receives a benefit and gives, in return, the collection document to the drawer. However, it is also possible that the person giving the benefit could create the collection document and give the collection document to the person receiving the benefit, who then signs the document and returns the collection document to the benefit giver. In the latter instance, it is hard to see who has the promise to pay and who is to receive the debt if the terms "drawer" and "drawee" are used.

Instead, the term "bearer" will be used to indicate who should be paid the debt. As used herein, the term "bearer" also describes who has the risk of loss. The term "debtor" will be used to describe who has promised to pay the debt. The term "unconditional" means that the debtor will pay the debt, or must be excused by the bearer for the debt or a portion of the debt. There could be, and generally are, conditions placed in the collection document. For instance, when the debt is due may be conditional. However, that the debt is due and is to be paid is not conditional. The debt must be paid or be excused. The following scenarios should help to solidify these definitions.

The current invention deals mainly with the following scenario: one company would like to receive a benefit now but pay for it later. This company (the debtor) then drafts a collection document and sends it to another company (the bearer). Alternatively, the other company, the bearer, sends the debtor the collection document. In either case, the debtor signs the collection document and, sometime thereafter, receives a benefit in return for the debtor's promise to pay a debt. The benefit is usually goods or services, and the debt is usually money. At some future date (determinable or "on-demand," which means "at the bearer's determination"), the debtor pays the debt to the bearer.

In other scenarios, the bearer can sell the collection document, generally for a price less than the debt, to another entity. If the other entity inherits the risk of loss, then this entity becomes the bearer of the collection document. The transfer of the risk of loss is usually memorialized in a writing. If the risk of loss does not pass, then the original person who is to be paid remains the bearer. For instance, if the bearer sells the collection document to a bank, but the bank does not have the risk of loss, then the bank is not the "bearer" as defined herein. The original party who is to be paid remains the bearer, because the original party still has the risk of loss. On the other hand, if the bearer sells the collection document to a third person (e.g., by placing the collection document on the open market and selling to the highest bidder), and the third person then has the risk of loss, then the third person is the bearer.

Although the current invention is best suited to situations where there are two parties, one of which is promising to pay the other, the above definitions may also be applied to the situation where there is a third party payee. Whoever has the risk of loss is still the bearer. For instance, if a first company creates, signs, and sends a collection document to a second company, it is possible that the first company is to pay a third company the debt. In this situation, the second company usually owes the third company money; thus, the third company—instead of the second company—is to be paid the debt. However, the risk of loss is still on the second company in this scenario, as this company is the company who still owes the third company. The second company is still the bearer.

In general, however, the current invention treats collection documents more like invoices, which indicate when future income or future debt is to occur. The two-party scenarios given above contain collection documents that may be tracked by the current invention; the third-party scenario of the previous paragraph is a less likely scenario that still might be tracked by the current invention. Thus, the current invention can support both "bills of exchange" and "promissory notes," as defined above, although different terminology is used to describe the entities in the transaction.

It is important to note that a collection document is a legal instrument in which the debtor promises to pay the bearer. Thus, the legal instrument must be memorialized, generally by having at least the debtor sign the instrument. There may be additional legal requirements that a local state, city, or country may place on collection documents. For instance, both the debtor and the bearer might have to sign the document, or the document might have to be notarized.

Detailed Description

The current invention uses an extensible Object-Oriented (OO) framework in an object-oriented programming system to define objects and classes used to correspond to and track a collection document. The collection document can be an accounts receivable (the debt is to be received) or an accounts payable (the debt is to be paid) collection document. A collection document is an unconditional order in writing in which a debtor promises to pay a debt to a bearer in exchange for at least one benefit that has been or will be received by the debtor. The OO framework mechanism defines a collection document object that corresponds to and tracks a collection document through its many states until the collection document finally ends in an ending state. Even then, the collection document object may be retained (e.g., in a persistent or frozen state) for future reference.

In the most preferred embodiment, the present invention uses the life cycle technology shown in the copending application entitled "A METHOD OF DEVELOPING A SOFTWARE SYSTEM USING OBJECT ORIENTED TECHNOLOGY", by Kabohrer, et al., Ser. No. 09/038,024, filed Mar. 11, 1998, which is incorporated herein by reference. This application will be termed the "Life Cycle Patent" herein. While not required for the practice or implementation of the current invention, the life cycle technology of the Life Cycle Patent has many benefits for the current invention. These benefits will be described below.

Also in the most preferred embodiment, there is one abstract base class that contains methods, data, and attributes that are common to both an accounts receivable and an accounts payable collection document object. By having a base class, the core functionality of the collection document objects are already provided. Each accounts receivable (AR) and accounts payable (AP) collection document object then preferably inherits from these classes to provide the methods, data, and attributes that are desired for this particular collection document. Each type (AR or AP) of collection document object will have a variety of states that the object may be in. These states correspond to states of the "real" collection document (i.e., the legal instrument wherein the debtor promises to pay the bearer a debt). Each state is entered and exited through transitions. In the most preferred embodiment of the invention, the transitions are transition extensions, also known as "extensions" in the Life Cycle Patent. Because transition extensions may be easily modified, deleted, and/or added, the states and the paths through the various states may be easily modified. Because of this ease of modification, in the most preferred embodiment of the present invention, the recommended method of extending the application is by changing the transition extensions, and not by subclassing the AP or AR classes.

Turning now to FIG. 1, this figure shows a computer system 100 that supports an object-oriented environment in accordance with a preferred embodiment of the present invention. Computer system 100 includes a plurality of processors 110 through 120, a terminal interface 150, an auxiliary storage interface 160, a workstation 170, a Direct Access Storage Device (DASD) 180, a bus 140, a network interface 175, and a memory 130 that includes multiple locations for containing various software programs. In this example, memory 130 includes an object-oriented operating system 180 that provides an object-oriented environment, an object-oriented accounting application 150, a number of collection document objects 160 through 170, a number of transition extensions 181 through 183 that are associated with collection document object 160, and a number of transition extensions 185 through 187 that are associated with collection document object 170.

Processors 110 through 120 perform computation and control functions of system 100. All processors associated with system 100 may each individually comprise a single integrated circuit, such as a microprocessor, or may comprise any suitable number of integrated circuit devices and/or circuit boards working in cooperation to accomplish the functions of a central processing unit. All processors are capable of suitably executing the programs contained within memory 130 and acting in response to those programs or other activities that may occur in computer system 100.

Memory 130 is any type of memory known to those skilled in the art. This would include Dynamic Random Access Memory (DRAM), Static RAM (SRAM), flash memory, cache memory, Read-Only Memory (ROM), etc. While not explicitly shown in FIG. 1, memory 130 may be a single type of memory component or may be composed of many different types of memory components. For example, memory 130 and processors 110 through 120 may be distributed across several different computers that collectively comprise system 100. For example, collection document object 160 may reside on one computer with processor, while collection document object 170 may reside on another computer system with a separate processors Computer system 100 of FIG. 1 simply illustrates many of the salient features of the invention, without limitation regarding the physical location of processors 110 through 120 or the memory locations within memory 130.

Bus 140 serves to transmit programs, data, status and other forms of information or signals between the various components of computer system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 900, normally through a workstation 170. Workstation 170 is preferably a computer system such as an IBM personal computer or RS/6000. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk. DASD 180 may also be any other type of DASD known to those skilled in the art. This would include CD-ROM drives, hard disk drives, optical drives, etc.

Network interface 175 is used to connect other computer systems and/or workstations to computer system 100 in a networked fashion. The present invention applies equally no matter how computer system 100 may be connected to other computer systems and/or workstations, regardless of whether the connection is made using present day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. The program product tangibly embodies a program of machine-readable instructions executable by a computer system (such as computer system 100) having an operating system that supports an object-oriented program environment. The program product, in combination with computer system 100, directs computer system 100 to perform the embodiments of the current invention. Examples of signal bearing media include recordable type media such as floppy disks (e.g., disk 190) and CD ROMS, and transmission type media such as digital and analog communication links, including wireless communication links.

Accounting application 150 provides the interface between a human user of computer system 100 and collection document objects 160, 170 and the various transition extensions associated with the collection document objects. In the most preferred embodiment of the present invention, accounting application 150 comprises the collection document objects 160, 170 and the various transition extensions associated with the collection document objects. Accounting application 150 calls constructors to create collection document objects, freezes collection document objects, and, if desired, deletes collection document objects. Accounting application 150 may also subclass the collection document objects, or change transition extensions, to provide additional or different functionality.

Each collection document object 160 through 170 corresponds to and tracks either an AR or an AP collection document. Each collection document object preferably inherits from a base class (not shown), called CommonCollDoc, that contains methods, data, and attributes applicable to both AR and AP collection document objects and their corresponding collection documents. For instance, a value that represents the debt owed by the debtor will usually exist for both types of collection documents. Also not shown in FIG. 1 is the life cycle base class from which the CommonCollDoc base class inherits and some assorted objects that are shown in more detail in FIGS. 2 and 3. The life cycle base class, as further discussed in the Life Cycle Patent and below, provides certain advantages with the current invention. These topics are discussed in more detail below.

Transition extensions 181, 183, 185, and 187 are objects that provide transitions between states. It is possible that each collection document object 160 through 170 has its own set of transition extensions. For instance, in FIG. 1, collection document object 160 has transition extensions 181 through 183, while collection document object 170 has transition extensions 185 through 187. In general, however, all AP collection document objects will have the same transition extensions (and, thus, the same states), and all AR collection document objects will have the same transition extensions (and the same states).

Figure 2:
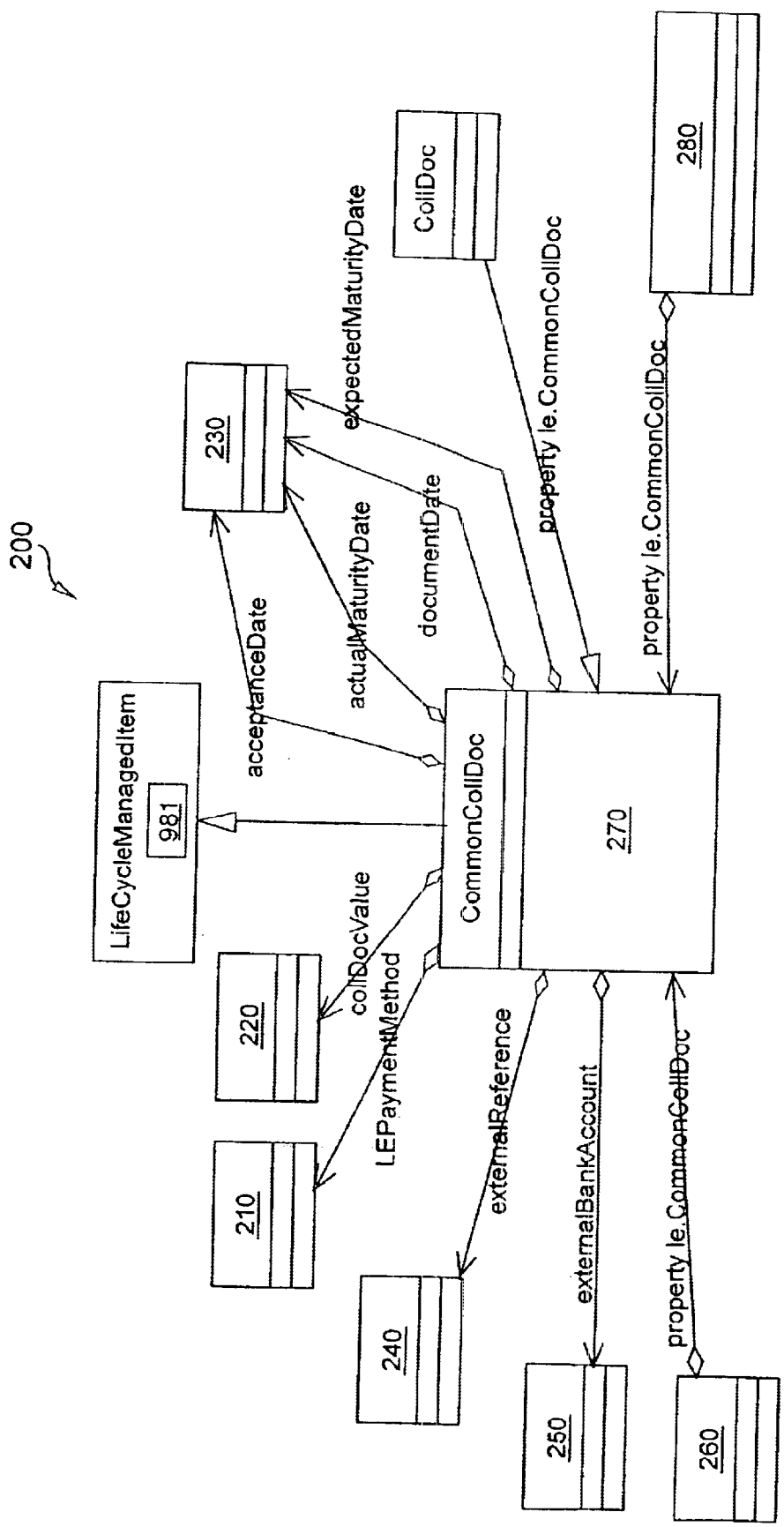
FIG. 2 is a block diagram of one preferred object relation diagram for a common collection document object in accordance with a preferred embodiment of the present invention.

Turning briefly now to FIG. 2, FIG. 2 shows a block diagram of the relationships between classes and objects for one preferred OO structure for the current invention. In this preferred structure, CommonCollDoc is a base class that is preferably abstract and that contains the methods, attributes, and data that are common to both AR and AP collection document objects. An AR collection document object (and its corresponding collection document) essentially means that this company, the company using accounting application 150, has provided a benefit to a debtor. This company is the bearer of the collection document and the debtor has promised to pay the bearer a debt in return for the benefit. The debtor is to pay the debt to the bearer at some time. Therefore, the AR collection document in this instance represents future income. On the other hand, an AP collection document means that the company using accounting application 150 has received a benefit from another company and has promised to pay the other company a debt in return for the benefit. Therefore, the AP collection document in this case represents a future debt.

Both AR and AP collection document classes preferably inherit from CommonCollDoc. For instance, CollDoc in FIG. 2 inherits from CommonCollDoc. CollDoc, in this example, is an AR collection document class. AR collection document objects may be instantiated from the CollDoc class.

CommonCollDoc inherits from the LifeCycleManagedItem class. The LifeCycleManagedItem class provides the life cycle technology described in the Life Cycle Patent. This allows methods and objects having those methods to be added and removed during runtime. The latter benefit of the life cycle technology allows states to be manipulated fairly easily and allows many small state machines as opposed to one gigantic state machine. This is shown in reference to FIG. 5. The LifeCycleManagedItem contains table 981, which will be discussed below and which, through inheritance relationships, is part of CollDoc.

The current invention is best described in reference to the life cycle of a collection document and its corresponding collection document object. Although the structure of classes and how they cooperate to perform the function of the current invention is important, a state diagram makes it easier to show how the collection document functions at a high level.

Figure 5:
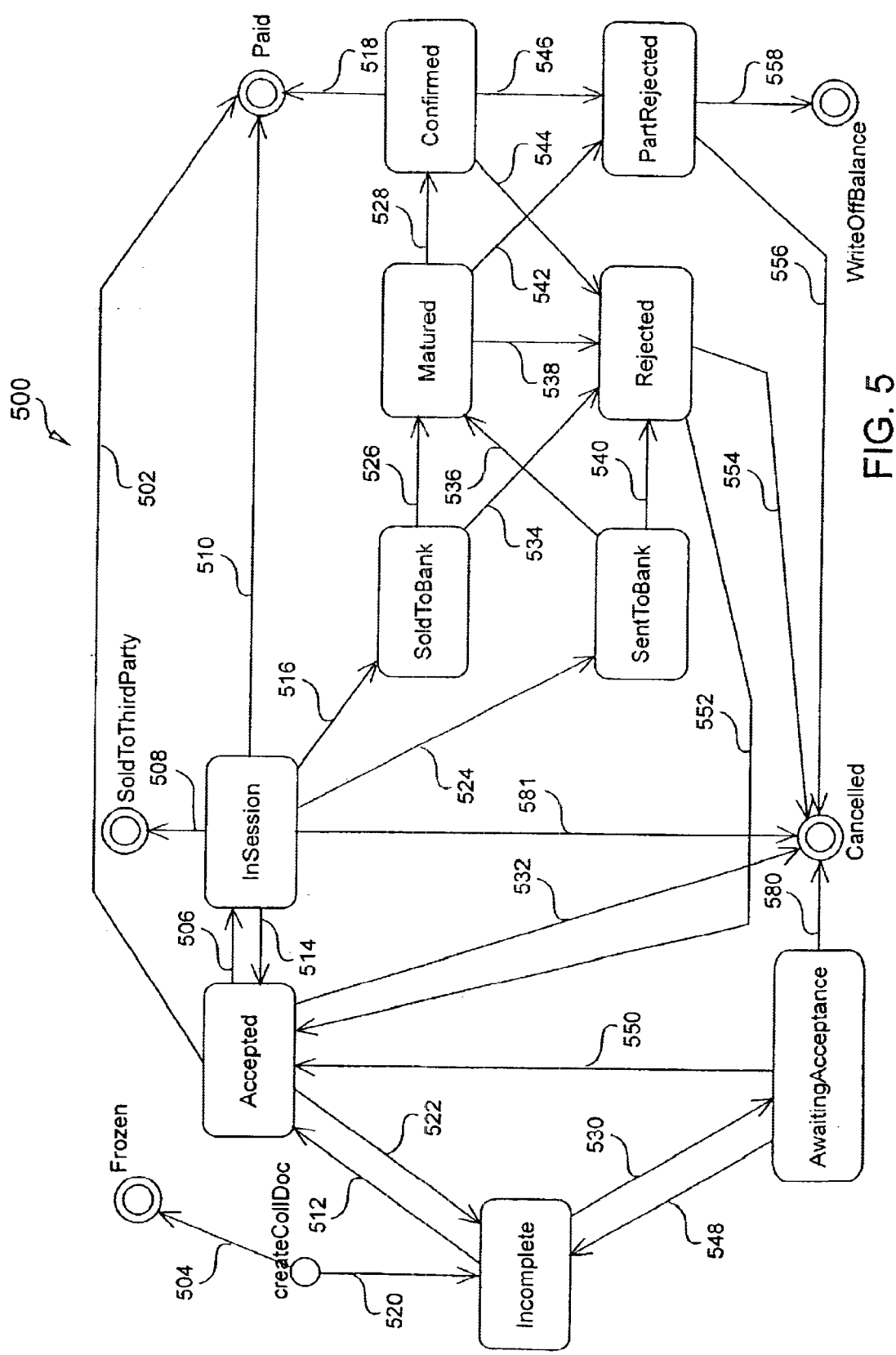
FIG. 5 is a state diagram for an accounts receivable collection document, in accordance with a preferred embodiment of the present invention.

Turning now to FIG. 5, a state diagram 500 for a preferred AR collection document object is shown. State diagram 500 is an example of the many states that AR collection document objects may be in. These states are merely exemplary, and additional, different, or fewer states may be in the state diagram. Each state in the state diagram preferably corresponds to a state of a collection document (the legal instrument wherein the debtor promises to pay the bearer). State diagram 500 also shows a life cycle, as there is one creation state and several ending states. State transitions are accomplished through transition extensions. For instance, transition extension 512 causes an AR collection document object to transition from an incomplete state to an accepted state. Once in a particular state, the allowed transitions to other states are indicated by the transition extensions that leave the particular state. For example, a collection document object in the accepted state may transition to another state through transition extensions 506, 502, 532, and 522. To determine how a collection document object arrived in the current state, the transition extensions that enter that state can be determined. For instance, the accepted state may be reached through transition extensions 512, 514, 552, and 550. However, once in a state, it generally is not possible to determine the previous state. Nonetheless, previous state tracking may be added as a feature if desired.

The beginning state for any collection document object is when the collection document object is created. In FIG. 5, this is the "createCollDoc" state. The following states are ending states: Frozen, Cancelled, SoldToThirdParty, Paid, and WriteOffBalance. The following list discusses the states, transition extensions that exit the states, and how the states correspond to the "real" collection document (the legal document wherein the debtor has promised to pay the bearer). The names of the transition extensions are exemplary. Because this is a state diagram of an AR collection document, the states are essentially shown from the bearer's viewpoint.

createCollDoc—this state occurs when the constructor for a CollDoc object is called. This state corresponds to the creation of a collection document. Depending on how the constructor for the createCollDoc is called determines whether the CollDoc is Frozen or Incomplete. Transition Extension (TE) 504 (no name) transitions to the Frozen state. Transition extension 520 (no name) transitions to the incomplete state.

Frozen—essentially a copy of the current collection document object. This state corresponds to a copy of the current collection document, as long as an indication of the state is made on the collection document. If the collection document object is in a rejected state, and transitions back to accepted, the CollDocResettableFromReject makes a copy of the current collection document object and freezes it. The copy is associated with the one that is now being processed. The copy is for historical purposes. The transition between the rejected and accepted states may occur, for example, if the debtor previously told the bearer that the debtor cannot pay some or all of the debt, but the debtor recently has stated that it might be able to pay some or all of the debt. Because Frozen is an ending state, there are no transition extensions leading from this state.

Incomplete—this is a temporary state in which it is chosen to go to either the Accepted state or the AwaitingAcceptance state. This corresponds to a collection document wherein the collection document is incomplete for some reason (e.g., the debtor has not signed it or there is no debt amount). If the debtor sends the collection document to the bearer, and the bearer is using the current invention to track the collection document, then the Accepted state is chosen. This occurs because the debtor has already accepted the collection document. If the "bearer," or the company who wants to be the bearer of the collection document, sends the collection document to the debtor and is awaiting the debtor's acceptance of the collection document, then the AwaitingAcceptance state is chosen. This signifies that acceptance of the collection document by the debtor has not yet been received. TEs 512 and 548 are called CollDocCompletable, which can be polymorphic or use an input to determine to which state to transfer.

Accepted—chosen when the debtor sends the collection document to the bearer, and the bearer is using the current invention to track the collection document. This usually corresponds to a complete collection document, although non-complete collection documents may be marked in this state temporarily until it is discovered that they are incomplete. Generally, a benefit (usually goods or services) will be transferred to the debtor sometime before the collection document is placed into the accepted state. The usual scenario is that the debtor has already received the benefit before the collection document is signed (and, thus) becomes an official legal instrument that indicates that the debtor is to pay the bearer the debt. However, the current invention could also track collection documents that are signed and legalized after or contemporaneously with the debtor's receipt of the benefit. CollDocPayableEarly 502 means that the debtor has informed the bearer that the debtor would like to pay the debt earlier than the due date. CollDocAddableToSession 506 adds the collection document object to a session (discussed below). CollDocCancellableEarly 532 means that the collection document is cancelled for some reason (see below for the cancelled state). CollDocResettableToIncomplete 522 indicates that something was wrong with the collection document. For instance, the debtor may not have signed the collection document, there was no due date on the collection document, the debt amount was not on the collection document, etc.

AwaitingAcceptance—this signifies that acceptance of the collection document, sent to the debtor by the prospective bearer, has not yet been received. If the "bearer," or the company who wants to be the bearer of the collection document, sends the collection document to the debtor and is awaiting the debtor's acceptance of the collection document, then the AwaitingAcceptance state is chosen. In the case of a real collection document, this state indicates that a collection document has been made but that it is not yet a legal document, as the debtor has not promised to pay the debt. Generally, a benefit has already been transferred to the debtor at this time. In other words, the debtor has received and is using the benefit before the collection document is signed and memorialized. However, the current invention may also track collection documents wherein the debtor has not yet received the benefit or is, contemporaneously with memorialization of the collection document, is receiving the benefit. CollDocCancellableEarly 580 indicates that the collection document is cancelled for some reason (see below for the cancelled state). CollDocAcceptable 550 means that the debtor has decided that the collection document is acceptable, has signed the collection document, and the collection document is a valid, legal document wherein the debtor promises to pay the bearer a debt. CollDocResettableToIncomplete 548 indicates that something was wrong with the collection document. For instance, the debtor may not have signed the collection document, there was no due date on the collection document, the debt amount was not on the collection document, etc.

Cancelled—The collection document was not going to be paid or was not going to be completely paid. The collection document may be sent to a collection organization, who would try to receive the debt from the debtor. The collection document object (and collection document) is closed but remains for reporting purposes. For instance, if half the collection documents from one person are cancelled, the bearer company can track this. Because Cancelled is an ending state, there are no transitions extensions leading from this state. Preferably, cancelled also means that the debt is still in AR. If the bearer wishes to write off the debt, such that the debt no longer shows as receivable or payable, the bearer preferably uses the WriteOffBalance state (from the PartRejected state) and not the Cancelled state. Note that Cancelled does not necessarily mean that the bearer will not be paid for the debt; instead, this state simply means that this collection document will not be paid. For instance, the debtor might send another collection document to the bearer wherein the debtor promises to pay the same debt, a larger debt, or a smaller debt. This situation could occur if a different bank is being used by the debtor, so the debtor sends a new collection document with the new payment method.

InSession—This essentially means that the collection document object is to be put in with a variety of other collection document objects. Generally, if the company (the bearer of the collection documents) has more than one collection document object having similar or the same due dates, these are "bundled" into a collection for transfer to a bank or a third party. Similarly, this state may be used to bundle collection documents that will be paid from one particular bank. For the real collection document, it too would be bundled together with other collection documents for transfer to a bank or third party. Thus, a group of collection documents could have the same life cycle. While this group functionality is provided, in general, single collection documents transition to and from states separately from other collection documents. The InSession state allows an application to process more than one collection document at a time, if this functionality is desired. Even if the group functionality is used, it is preferred that individual collection documents be able to have its own life cycle. CollDocSellableToBank 516 is a transition extension that indicates that the group of collection document objects (and their corresponding collection documents) has been sold to a bank, generally at a reduced fee. When collection documents are sold to a bank, the risk of loss usually remains on the bearer that sells the collection documents. Thus, if the debtor does not pay the bank, the bearer is responsible to either retrieve the money from the debtor or to pay the bank. The original bearer of the collection documents remains the bearer (the bank is not the bearer). The transition extension CallDocSendableToBank 524 indicates that the group of collection documents have been sent to the bank. The bank then collects the money for these collection documents, when the time for collection is due, and gives the money to the bearer. CollDocCancellableEarly 581 means that the debtor has stated that it will not pay the debt or a portion of the debt. This is usually an unequivocal statement. CollDocPayableEarly 510 preferably occurs when the debtor has payed before the due date. CollDocPayableEarly 510 could also indicate that the debtor would like to pay early, if this is desired. Finally, CollDocResettableFromInSession 514 indicates the collection document object is not going to be a part of the current group of collection document objects. This transition extension would be used, for instance, if there has been a mistake placing the collection document object into the wrong session. Such a mistake could occur if the session (the group of collection documents that are bundled together for some reason) contained, for instance, collection document objects that were to be paid from a particular bank. If a collection document object, due to be paid from a different bank, were inadvertently or mistakenly put into this session, then this collection document object would have to be removed from this session. The collection document object can then be put into the correct session or tracked singly.

SoldToThirdParty—the group of collection documents is sold to a third party. The original bearer receives money (or goods or services) for the collection document. The risk of loss generally passes to the third party during this sale. For instance, if the debtor informs the third party that the debtor cannot pay the debt, the third party is responsible for the debt and the original bearer is not responsible for the debt. In this case, the third party becomes the bearer. The collection document objects are still retained for future informative uses.

SoldToBank—the bundled collection documents have been sold to a bank, usually at a cost less than the debt. The original bearer receives money (or goods or services) for the collection document. When collection documents are sold to a bank, the risk of loss usually remains on the bearer that sells the collection documents. Thus, if the debtor does not pay the bank, the bearer is responsible to either retrieve the money from the debtor or to pay the bank. The original bearer of the collection documents remains the bearer (the bank is not the bearer). The transition extension CollDoc-MaturableFromSoldToBank 526 means that the bundle of collection documents has reached maturation, which usually occurs at a specific date. CollDocRejectableFromSoldToBank 534 means that the debtor has informed the bank (or the bearer) that the debtor is not going to pay all or part of the debt owed to the bearer.

SentToBank—the group of collection documents has been sent to the bank for collection. The bearer does not receive money (or goods or services) from the bank until the bank collects from the debtor. The bank will attempt to collect the money due for the collection documents when the maturation date arrives. The bank then sends the money to the bearer of the collection documents. The bank may reduce the money collected by a collection fee. The transition extension CollDocRejectableFromSentToBank 540 indicates that the debtor has indicated that it will not pay some or all of the debt. CollDocMaturableFromSentToBank 536 indicates that the group of collection documents is now matured, meaning that the debt is due. The debtor must pay the debt or reject payment.

Matured—the date for collection of the debt has arrived. The collection documents have matured. The collection document normally indicates a date when the debt is due, although the debt could be payable on demand by the bearer or payable at a determinable time. The bank attempts to collect the debt and then distribute the money collected to the bearer. The Matured state essentially means that the debt is due and that the bearer hopes that the debtor will pay the dept. The transition extension CollDocConfirmable 528 means that it is likely that the debtor has paid. CollDocPartlyRejectable 542 means that the debtor has stated that the debtor can only pay part of the debt. CollDocRejectable 538, on the other hand, means that the debtor has stated that the debtor cannot or will not pay any of the debt.

Rejected—the debtor has stated that the debtor cannot or will not pay any of the debt. Alternatively, the debtor has indicated that the debt will not be paid on this collection document. For instance, the debtor might negotiate with the bearer for more goods and services and send the bearer another collection document that includes the debt owed for both the new goods/services and the old goods or services. Thus, the old collection document is now rejected (and will likely transition to the Cancelled state). However, the new collection document has both the old debt and the new debt. The new collection document will be tracked by a new, separate collection document object (although a link between the two may be made, if desired). Regardless of the manner of entering the Rejected state, once in the Rejected state the collection document is in a partial "limbo," where it is unclear whether the debt will be paid. When it becomes clear that the debt will not be paid, the transition extension CollDocCancellableFromRejected 554 may be used to mark the collection document or group of collection documents as cancelled. If the debtor changes its mind, such that some or all of the debt will be paid, then CollDocResettableFromRejected 552 may be used to transition the collection document object to the accepted state. Note that this transition element will preferably make a copy of the collection document object by calling createCollDoc and using transition extension 504 to freeze the copy of the collection document object.

Confirmed—the debtor most likely has paid the debt. While no official confirmation (such as a bank statement) has been received, the time for a rejection has generally passed. Furthermore, for debtors with an excellent credit history, the transition from Matured to Confirmed may be automatically performed or performed after a short period. The transition extension CollDocPayble 518 means that official confirmation has arrived that the collection document has been paid. CollDocRejectable 544 indicates that the debtor has stated that it will not pay all or part of the debt. CollDocPartlyRejectable 546 means that the debtor has stated that it will not pay part of the debt.

PartRejected—the debtor has stated that it will not pay all of the debt that is due; part of the debt will be unpaid and part is or will be paid. The collection document is, again, in a type of limbo, where it is unclear if the bearer will be paid the entire amount due the bearer. The transition extension CollDocWriteOffBalance 558 means that the bearer has written off the portion of the debt that the debtor is not willing to pay. CollDocCancellable 556 indicates that the debt is not going to be paid, but the bearer is not willing to write off the debt. For example, if this is the only collection document on which the debtor has ever reneged, and the :portion of the debt is small, the bearer may be willing to write off the portion of the debt because of the bearer's relationship with this customer. On the other hand, if the debtor is a new client of the bearer's, and the debt is large, the bearer may not be willing to write of the debt.

Paid—the bearer has properly paid the entire debt. Because this is an ending state, there are no transition extensions leaving the state. The collection document object is maintained for reporting purposes. The collection document itself is also likely maintained (e.g., placed onto microfiche or filed) for record-keeping.

WriteOffBalance—the bearer has written off all or part of the debt owed to the bearer by the debtor. This could occur if the debtor simply will not pay and the bearer wishes to excuse the debt, or if there is such a small amount of debt owed that it is not worth retrieving. Because this is an ending state, there are no transition extensions leaving the state.

What FIG. 5 shows, therefore, is an entire life cycle—from creation at "createCollDoc," through one or more intermediate states, and then ending at one of a number of ending states—of an AR collection document object. The collection document itself also traverses the same states, and the collection document object's states correspond to the states of the collection document. FIG. 5 also shows that, while the current invention could be extended to three-party transactions (such as for bills of exchange, where a drawee is to pay money, received by a drawer, to a payee), the preferred use of the current invention is for two-party transactions, wherein a bearer gives a benefit to a debtor, and the debtor promises to pay the debtor sometime in the future.

It is preferred that AR and AP collection document objects be used solely to track debt. In other words, the AR and AP collection document objects are created once the debtor has received the benefit from the debtor and has memorialized the promise to pay the debt in a collection document. Thus, the most preferred embodiment of the present invention provides an object-oriented mechanism for tracking the debt owed by a person and memorialized in a collection document. However, as described below, the most preferred embodiment of the present invention may be extended to include other data associated with collection documents, such as what the benefit is, when the benefit was received, etc.

Accordingly, although not shown in FIG. 5, many changes may be made to the state diagram. For instance, it is possible that the bearer could sue the debtor for any unpaid balance of the debt. This state (such as "InCollection") could be added, for example, between the Rejected and Cancelled states. Then, only if the debt is never recovered could a collection document object enter the cancelled state. Additionally, there is no specific state to indicate that the benefit has been delivered to and accepted by the debtor. Generally, the Accepted state indicates that the benefit has been delivered to the debtor. Additionally, an attribute could also indicate delivery. Nonetheless, a state for delivery of the benefit to the debtor could be added to state diagram 500, if desired. Finally, there is no state to indicate whether money or goods or services are to be received as the debt. Usually the debt is paid by using money, but it is possible that the debt could be paid through goods and/or services. If so, there could be two "Paid" states: one for payment by money, and one for payment by goods/services. However, an indication of payment method could also be made by using attributes.

FIG. 5 illustrates an AR collection document object's states. An AP collection document object's states may be similarly designed. An AP collection document essentially means that there is a future debt, the debtor has received a benefit and has promised to pay the bearer of the collection document at sometime in the future. By "future debt," it is meant that there is a currently existing debt that comes due in the future. For an AP collection document object (and its corresponding collection document), most of the states will be fairly similar. For example, there will likely be a Paid state, a Creation state, a Frozen state, an Incomplete state, an AwaitingAcceptance state, an Accepted state, a Cancelled state, a PartRejected state, a Rejected state, and a Matured state. Some of the states will likely be different. For instance, the SoldToThirdParty state will not exist, because the debtor has nothing to sell to a third party. Similarly, the SoldToBank, SentToBank, and Confirmed states probably wouldn't exist. New states would likely also be added. For example, there would probably be a new state to indicate that the original bearer of the collection document has sold the collection document to a third party, who has become the new bearer and to which the debt is to be paid. There may be an Authorized state, wherein the debtor has authorized the payment of the debt. There may also be a type of confirmed state that could indicate that the bearer has sent confirmation of the payment of the debt. Based on the state diagram 500 of FIG. 5, one skilled in the art should easily be able to adapt the current invention to AP collection documents.

Now that the state diagram and life cycle of an example AR collection document object has been explained, a preferred structure for implementing the life cycle and the AR collection document will now be explained.

Returning to FIG. 2, this figure shows a preferred structure 200 for classes of the current invention. In particular, the CommonCollDoc class is preferably an abstract class having the methods, attributes, and data associated with both AR and AP collection document objects. This class also inherits from LifeCycleManagedItem, which is the life cycle technology of the Life Cycle Patent. Additionally, CollDoc is an AR collection document class from which collection document objects may be instantiated.

The CommonCollDoc class contains methods and data elements 270 that are common to both AR and AP collection document objects. For instance, methods such as those in the following incomplete, example list are contained in the CommonCollDoc class (comments are made if the methods are not self explanatory):

setDocumentDateAndExpectedMaturityDate ( ), where the document date is the date of reception of the collection document and the maturity date is the date that the debt is due or payable; setCollDocValue ( ), which sets the amount of debt (bank fees or other fees are subtracted elsewhere); setLEPaymentMethod ( ), which sets the type of payment, such as electronic funds transfer, check, credit/debit card, etc.; setExternalReference ( ), which provides a place for the application to set string information, generally used for the location of the actual collection document (i.e., which file cabinet, which office, etc.);

setExternalBankAccount ( ); setActualMaturityDate ( ); initialize ( ), which performs initialization not performed during creation; setID ( ), which allows an application to assign a unique identifier to the collection document object;

isStateValidForSetDocumentDateAndExpectedMaturityDate ( );

isStateValidForSetCollDocValue ( ); isStateValidForSetLEPaymentMethod ( );

isStateValidForSetExternalReference ( ); and isStateValidForSetExternalBankAccount ( ).

Many other methods common to both AR and AP collection document objects may be added in CommonCollDoc.

Attributes and data used for both AR and AP collection document objects are also exemplarily shown in FIG. 2. For instance; acceptanceDate, actualMaturityDate, documentDate and expectedMaturityDate are objects that are owned by CommonCallDoc and that are instantiated from a generic time and date class (such as DTime class 230). CollDocValue is an object that is owned by CommonCallDoc and that is instantiated from DTransactionValue class 220, a class that allows monetary values to be entered. Similarly, LEPayment method is an object that is not owned by CommonCallDoc and that is instantiated from LEPaymentMethod class 210, which allows payment methods to be entered. The attribute externalReference is owned by CommonCollDoc and is a String 240 "scratch pad" in which an application can keep String data. The attribute externalBankAccount is not owned by CommonCallDoc but is an object instantiated from the ExternalBankAccount class 250 that allows a bank account and associated information to be entered.

Additionally, other objects (and their corresponding classes) that need access to the CommonCollDoc class may access the object instantiated from the class. For instance, DebtManagement 260 and LE View of CFFI Bank Movement 280 may access the class. Because CommonCallDoc is preferably abstract, DebtManagement 260 and LE View of CFFI Bank Movement 280 will actually access objects instantiated from classes that inherit from CommonCallDoc. However, objects 260 and 280 will only be able to access CommonCallDoc's public interface, and not the public interfaces of the objects instantiated from the subclasses of CommonCallDoc.

Similar to attributes, non-object data that is applicable to both AR and AP collection document objects may be maintained in CommonCollDoc. By having CommonCollDoc contain the methods, data, and attributes associated with both AR and AP collection document objects, AR and AP collection document objects need only contain the methods, data, and attributes needed for their respective states and functionality.

Figure 3:
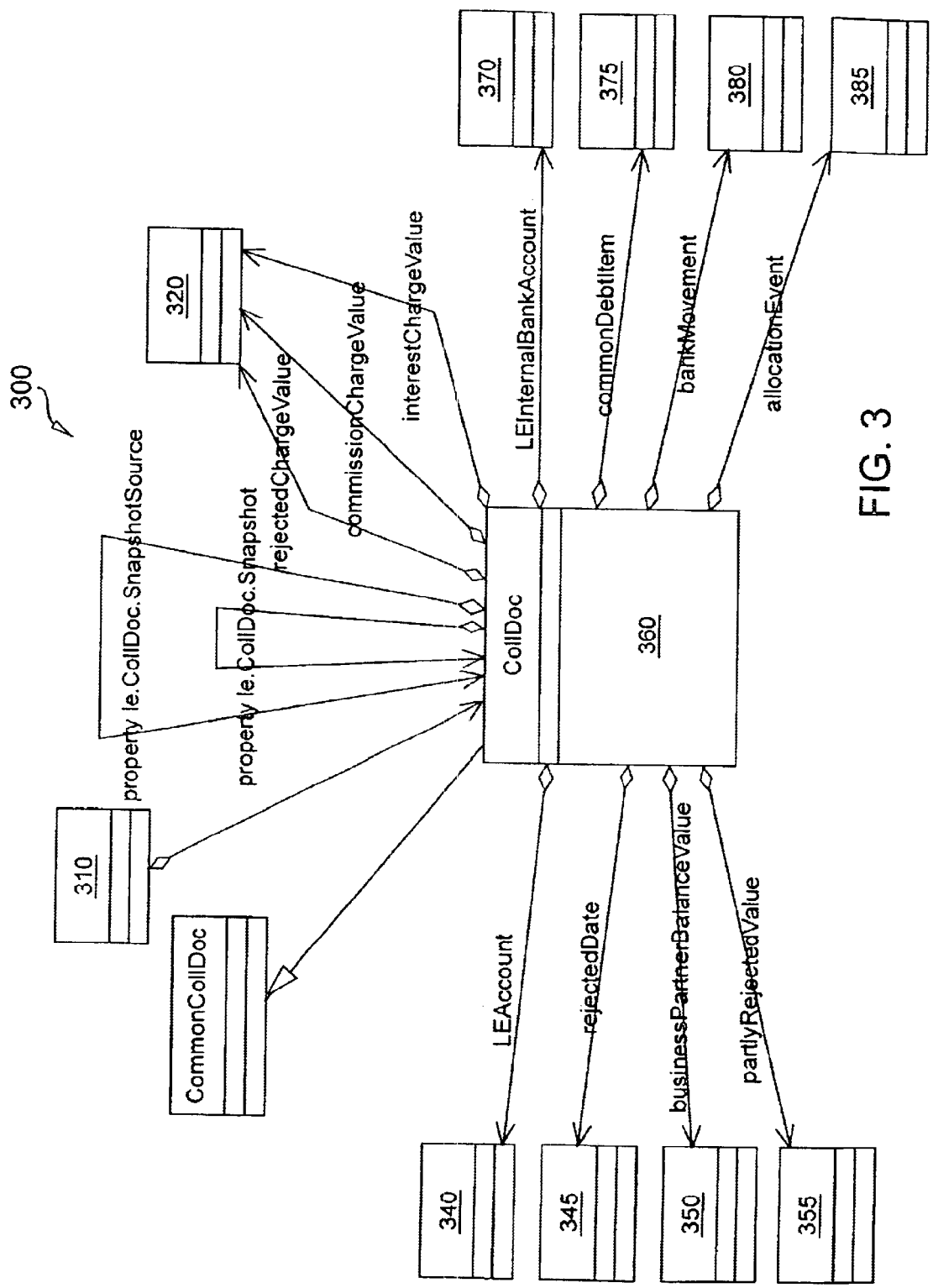
FIG. 3 is a block diagram of one preferred object relation diagram for an accounts receivable collection document object in accordance with a preferred embodiment of the present invention.

For instance, in FIG. 3, a preferred structure 300 for an AR collection document object and its class interrelationships are shown. The CollDoc class in this example contains the methods, data, and attributes that are required for an AR collection document object. CollDoc preferably inherits from CommonCallDoc. CollDoc comprises a variety of methods and data 360 that are necessary for an AR collection document object. For instance, methods such as those in the following incomplete, example list are contained in the CollDoc class (comments are made if the methods are not self explanatory): destroy ( ), which destroys the collection document object (this is rarely used, as collection document objects are almost always maintained); createCollDoc ( );

setLEInternalBankAccount ( ), which is an internal bank account;

setCommissionChargeValue ( ), which is the amount the bearer is charged by the bank for the service of processing and collecting the debt associated with the collection document;

setInterestChargeValue ( ), which sets the interest charged when the bearer sells the collection document to the bank (the bearer is essentially getting a loan from the bank, which is why there is no transfer of risk to the bank); setRejectedDate ( ), which sets the date for which rejection of the debt is assumed (after this date, it is assumed that the debtor is not going to pay the bearer); setPartlyRejectedValue ( ), which sets the amount of debt that will not be paid; setRejectedChargeValue, which sets the fee charged to the bearer by the bank if the payment of the debt by the debtor is rejected (similar to a returned-check charge); and setLEAccount ( ), which sets the identity of the debtor. Other methods may be added to adequately track an AR collection document object and its corresponding collection document.

The CollDoc object 360 may also be used or accessed by other objects. For instance, in the example of FIG. 3 CollDoc is owned by D_CollDocController 310. D_CollDocController 310 is an object that keeps track of all collection document objects. When an application wants to use/update a specific collection document object, the application does the using or updating by accessing the D_CollDocController 310 object. D_CollDocController 310 object is not necessary for the current invention, but simply illustrates one way to control multiple collection document objects. Using a single object to track and access the collection document objects is beneficial, as it provides one simple interface with which an application may access all collection documents. Thus, from an application's perspective, using a D_CollDocController 310 object simplifies accesses and monitoring of collection document objects.

Also shown in FIG. 3 are "snapshots" of a former collection document object. For instance, the attribute "property le.CollDoc.Snapshot" allows the CollDoc object to access a snapshot of a collection document object, while the "property le.CollDoc.SnapshotSource" attribute allows the CollDoc object to access the new collection document object related to the snapshot collection document object. Although only two snapshots are shown, many others may exist. As stated above, a snapshot is created when the collection document object transitions from Rejected to Accepted.

The CollDoc class also uses a variety of data (not shown in FIG. 3) and attributes that are applicable to AR collection document objects. For example, the following list shows some example attributes, the classes from which they are instantiated, and their functions (the filled-in diamonds mean that the attribute is owned by CollDoc, while the non-filled-in diamonds mean that the attribute is not owned):

the partlyRejectedValue attribute is an object that is instantiated from the DTransactionValue class 355, which allows monetary value to be input; businessParnerBalanceValue attribute is an object that is instantiated from BusinessPartnerBalanceValue class 350, which is a flag that indicates whether the CollDoc is for AR or AP; rejectedDate attribute is an object that is instantiated from the DTime class 345, which is a normal date and time class; LEAccount is an attribute instantiated from LEAccount class 340; rejectedChargeValue, commissionChargeValue, and interestChargeValue are all attributes that are instantiated from DCurrencyValue class 320, which allows input of monetary values;

LEInternalBankAccount is an attribute instantiated from LEInternalBankAccount class 370, which allows an internal bank account number to be input; commonDebtItem is an attribute instantiated from LECommonDebtItem class 375; bankMovement is an attribute instantiated from BankMovement class 380; and allocationEvent is an attribute instantiated from AllocationEvent class 385. The last three classes are high level banking account classes that provide tracking and support for interactions with a bank account object. For instance, the BankMovement class 380 would represent deposits, withdrawals, and the like. An "allocation event" (e.g., AllocationEvent class 385) is an object that indicates how a debt is settled. Generally, a payment would be created and added to an allocation event when the debt is paid. These objects are optional for the current invention, but are shown so that the CollDoc object's interaction with higher level bank processing may be shown.

Thus, diagram 300 indicates a preferred class structure for an AR collection document object. The methods, data, and attributes particular to AR collection document objects may be placed in a class similar to that described in FIG. 3. Additionally, AP collection document objects may also be created in a similar manner. Each type (AP or AR) of collection document object will preferably inherit from a base class (called CommonCollDoc in these examples) that contains the attributes, data, and methods common to both AR and AP collection document objects. It is preferred that CommonCollDoc be the "core" of the framework, such that CommonCollDoc is abstract and not changeable. Instead, classes that inherit from CommonCollDoc are preferably extensible and changeable.

To add additional attributes, it is recommended that CollDoc (or its AP equivalent) be subclassed. To add/remove/change states or the functionality between states, it is preferred that CollDoc (or its AP equivalent) is not subclassed. While subclassing is certainly possible, the life cycle technology that is preferably used makes the job of extending the current invention easier. This is discussed below. Because of the life cycle technology, the transition extensions between each state may be modified or excluded, or additional transition extensions may be added to change the state diagram and extend the current invention. The following discussion delves somewhat into the Life Cycle Patent, to which it may be beneficial to refer.

Figure 4:
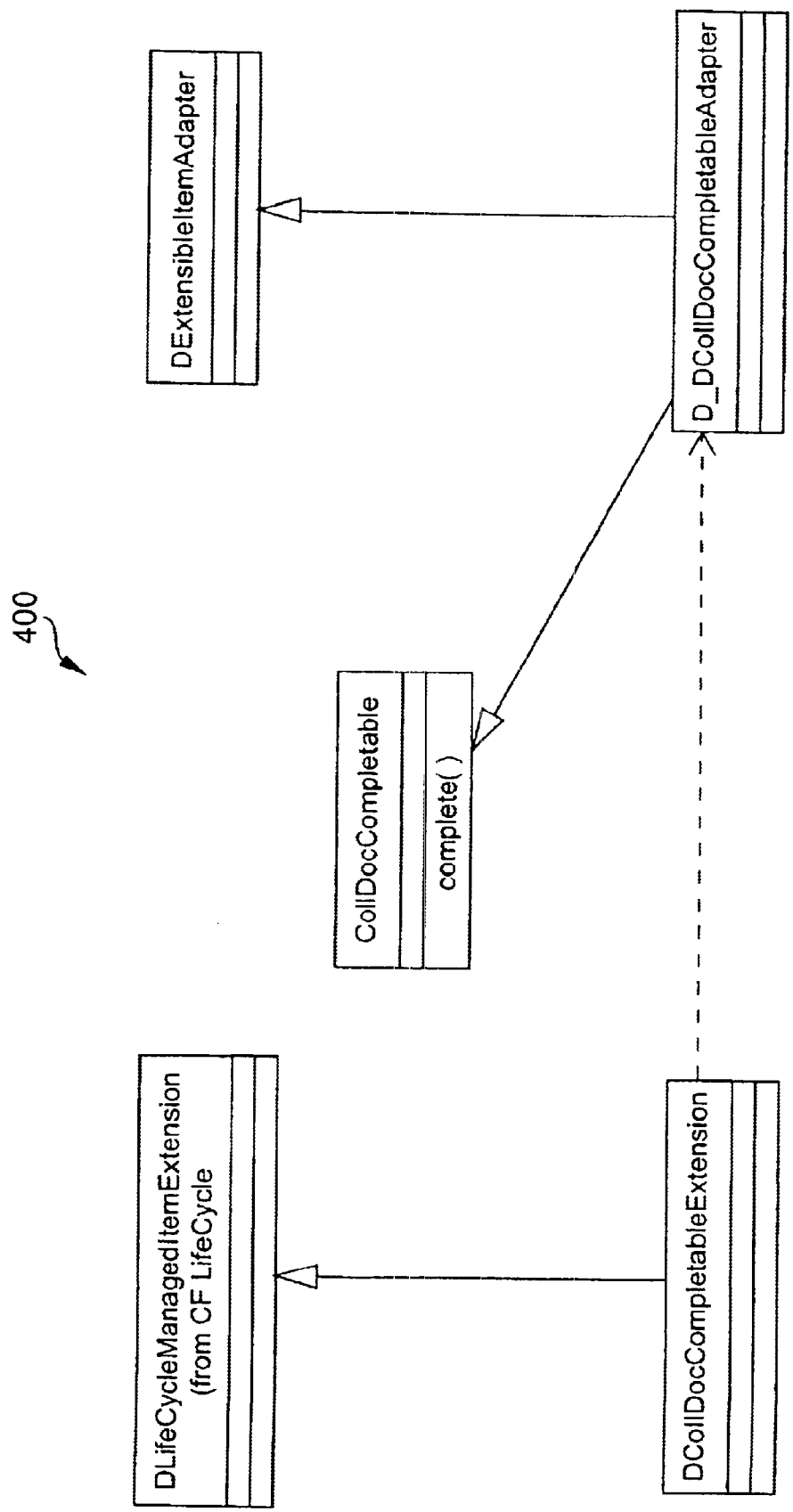
FIG. 4 is a block diagram of one preferred object relation diagram for a transition extension in accordance with a preferred embodiment of the present invention.

Turning now to FIGS. 2, 4, and 5, CommonCollDoc preferably inherits from LifeCycleManagedItem, which implements a life cycle in accordance with the Life Cycle Patent. In the terminology of the Life Cycle Patent, CollDoc is a concrete item, while the transition extensions shown in FIG. 5 are life cycle managed item extensions. When each transition occurs, each transition informs the life cycle managed item portion of CommonCollDoc that it has transitioned. The life cycle then updates itself according to certain rules. For instance, if the collection document object is in the Accepted state (see FIG. 5) and the CollDocAddableToSession 506 transition extension is executed, the life cycle managed item then knows that transition extensions 510, 516, 524, 508, and 581 are now the current, allowed transition extensions. These transition extensions will be entered into the table (shown as item 420 of FIG. 6 in the Life Cycle Patent), as will their methods. In addition, the previously valid transition extensions (transition extensions 506, 532, and 502) will be removed from the table. Furthermore, the life cycle managed item will update and cache the current state. This allows the CollDoc object to be queried as to its current state.

One benefit of the life cycle technology is simpler, smaller designs for state machines. For instance, a state machine that would have to know all of the states and transitions available in FIG. 5 would be a large state machine. Because previous transitions are removed and new transitions are added to the life cycle table when any state is entered, the state machine only needs to know what to remove, what to currently add, and what will be added if there is a transition. For instance, if in the InSession state, a state machine would only have to know TEs 514, 516, 581, 508, 524, and 510, and what TEs will be added on a transition through any of these TEs. Additionally, the states are easier to track, as the state machine, as part of the life cycle managed item, knows the current state.

The LifeCycleManagedItem class has a table that lists which transition extensions are now valid. This table is shown in FIG. 2 as table 981. The table has a set of rules for each valid transition extension that tells what happens for each transition extension. For instance, if the current state is the Matured state, the valid TEs are transition extensions 528, 542, and 538. The rules corresponding to each state indicate the following: if transition extention 528 is taken, the Confirmed state is entered and TEs 518, 546, and 544 are the valid TEs; if TE 542 is taken, the PartRejected state is the next state and TEs 556 and 558 are the valid TEs; and if TE 538 is taken, the Rejected state is the next state and TEs 554 and 552 are the valid states. This table is set up during initial configuration. Furthermore, subsequent rules, after initialization, are also preferably part of the LifeCycleManagedItem. The subsequent rules are then loaded as transitions occur. The subsequent rules will usually also be set up during initialization (e.g., through a header file, static data, additional tables, etc.).

Thus, a change to the initial configuration of table 981 or to the subsequent rules will add or remove TEs. If a TE is removed, transitions to certain states may be impossible or problematic. For example, if TE 510 is removed from the table, it will not be possible to directly transition from the InSession state to the Paid state, although it is still possible to indirectly transition from the InSession state to the Paid state (e.g., by using the SoldToBank, Matured, and Confirmed states, for instance). By changing the rules, one can change into which state the collection document object transfers. For instance, modifying the rule corresponding to TE 510 could allow a collection document object to transition from InSession to Confirmed. Similarly, modifying the rule corresponding to TE 510 could allow a state intermediate InSession and Paid. Note that another TE from the intermediate state to the Paid state would have to be created and added to the LifeCycleManagedItem table and its rules.

While it is preferred that the LifeCycleManagedItem change the rules and the table, transition extensions themselves may also change the table and the rules associated with the table. As is known in the art, the transition extensions do not have to be objects, but could be methods on CollDoc (or its AP equivalent) if desired. Furthermore, CollDoc or CommonCollDoc may contain tables or other structures that contain the information in the LifeCycleManagedItem's table of TEs and their associated rules. For instance, CollDoc or CommonCollDoc could implement one table, similar to the table in LifeCycleManagedItem. In this embodiment, each transition would be performed by a method, and not by a TE, and CollDoc/CommonCollDoc could update the table after each transition. Alternatively, CollDoc or CommonCollDoc could contain one table for each transition or one large state table that contains data that indicates the states, the allowed transitions for a state, and the rules for each transition. As mentioned above, using life cycle technology is preferred, as the state machine is smaller and it is easier to determine the current state and the available transitions.

FIG. 4 shows one version of a transition extension. This is the transition extension CollDocCompletable 530, 512. Transition extension 400 comprises a DCollDocCompletableExtension that inherits from DLifeCycleManagedItemExtension. DCollDocCompletableExtension uses (but does not have as an attribute) D_DCollDocCompletableAdapter, which inherits from both DExtensibleItemAdapter and CollDocCompletable. CollDocCompletable is preferably an interface (in the JAVA language) or is abstract (in the C++ or similar object-oriented languages). DCollDocCompletableExtension preferably implements the complete ( ) method.

By changing the complete ( ) method that is implemented by the DCollDocCompletableExtension, one skilled in the art can change the functionality of a transition extension. Each transition extension is designed almost exactly like that shown in FIG. 4, except that each name changes slightly. For example, CollDocResettableToComplete would have a resetToComplete ( ) method that is described by a CollDocResettableToComplete interface and would have a DCollDocResettableToCompleteExtension that implements the resetToComplete ( ) method. By subclassing the particular "DCollDoc...Extension" for the transition extension that needs to be changed, one skilled in the art can change the appropriate transition extension method to perform whatever function is needed.

The adapter classes and objects (D_DCollDocCompletableAdapter and DExtensibleItemAdapter) are a convenience to the application. These adapters provide the application something to work with, without having to know the details of the life cycle managed item. In FIG. 4, the DCollDocCompleteableExtension is the object that is added to the life cycle table (see table 420 of FIG. 6 of the Life Cycle Patent), along with its method "complete ( )."

To cross reference this with the Life Cycle Patent, the DCollDocCompletableExtension is Extension 502 of the Life Cycle Patent, while the D_DCollDocCompletableAdapter is Adapter 503 (see FIG. 3 of the Life Cycle Patent). Thus, even though the extension has the method (in FIG. 4 of this application, the "complete ( )" method), a call to a CollDoc for the method will return an adapter object. This hides all of the logic that is needed to call the right method and that is performed by the adapter.

The following is an example of how an application would call the TE CollDocPartlyRejectable and then call the partlyReject ( ) method on the returned object.

```
CollDoc cd = new CollDoc;  // create an AR collection document
CollDocPartlyRejectable cdAfterCast = (CollDocPartlyRejectable)
    cd.castTo("com.ibm.sf.le.CollDocPartlyRejectable");
// call "castTo" on CollDoc, which inherits this from LifeCycleManagedItem
// The LifeCycleManagedItem then finds the object that has this method
// and returns this object. This hides all of the complex manipulation to determine
// which extension or adapter has the method. This manipulation is discussed
// in the Life Cycle Patent in reference to FIGS. 4 through 7.
CollDocResult result = cdAfterCast.partlyReject (journalForRejectedValue,
    rejectedValue, ttvReject, null, null, null, null, null, null);
// now the application uses the returned object to make the desired method
// call (to partlyReject)
The adapter software looks like the following.
public CollDocResult partlyReject (GenericGLJournal journalForRejectedValue,
    DTransactionValue partlyRejectedValue, TransactionTypeValue
    ttvForRejectedItem, String idForRejectedItem, DCurrencyValue
    rejectedChargeValue, GenericGLJournal
    journalForRejectedChargeValue, TransactionTypeValue
    ttvForRejectedChargeValue, GenericBankTransaction
    bankTransactionForRejectedValue, GenericBankTransaction
    bankTransactionForRejectedChargeValue) throws
    com.ibm.sf.gf.SFException {
    Object parms[] = {journalForRejectedValue, partlyRejectedValue,
        ttvForRejectedItem, idForRejectedItem, rejectedChargeValue,
        journalForRejectedChargeValue, ttvForRejectedChargeValue,
        bankTransactionForRejectedValue,
        bankTransactionForRejectedChargeValue
    };
    return (CollDocResult)
        getExtensibleItem().invokeMethod ("partlyReject", parms);
    // this calls the correct method on the correct extensible item
}
```

Thus, much of the complex, underlying structure of the life cycle and how it determines which method is on which extensible item is hidden from the application. Using life cycle technology has the benefits of allowing easy changes to states and transitions, smaller state machines, easier state tracking, and less complicated AR or AP collection document objects and an application's interaction therewith. Thus, using the life cycle technology is preferred. However, life cycle technology is not necessary for the implementation or practice of the current invention.

What has been shown is a framework that runs in an object-oriented programming environment and that provides a collection document object that corresponds to and tracks a collection document. The framework has a core that is preferably not extensible and another portion that is extensible. The many states of the current invention are traversed through the use of transitions, which a preferably transition extensions. Although not specifically required, life cycle technology is preferably used to implement the transition extensions.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
    at least one processor;
    a memory; and
    an operating system residing in the memory and supporting an application having an application interface layer and an underlying application functionality layer associated with the interface layer, wherein the functionality layer comprises an object-oriented environment comprising a framework that provides at least one collection document object that corresponds to and tracks a collection document, which is an unconditional order in writing as satisfaction of a debt in which a debtor promises to pay a bearer in exchange for at least one benefit that has been or will be received by the debtor, wherein the at least one collection document object has a life cycle that begins when the at least one collection document object is created in a creation state, that traverses at least one of a plurality of intermediate states and that ends at one of a plurality of ending states, each state of the collection document object corresponding to a state of the collection document, each state connected to at least one other state through at least one transition.

2. The apparatus of claim 1 wherein the collection document indicates that the debt is to be paid on a due date.

3. The apparatus of claim 1 wherein the plurality of intermediate states comprise a state that indicates that the collection document has been sold to a bank but that the bearer retains risk of loss, a state that indicates if the collection document was sent to the bank for the bank to collect payment, and a state that indicates that the debt is now due.

4. The apparatus of claim 1 wherein the plurality of ending states comprise a state that indicates that the collection document was sold to a third party and that the bearer does not retain risk of loss, a state that indicates that at least a portion of the debt has been cancelled, a state that indicates that at least a portion of the debt has been written off, and a state that indicates that the debt has been paid.

5. The apparatus of claim 1 wherein each of the transitions is a transition extension that causes its respective transition from a current state to a next state and wherein previously defined transition extensions are removed and new transition extensions are added during respective transitions from a current state to a next state.

6. The apparatus of claim 1 wherein the collection document object further comprises at least one table, the at least one table corresponding to at least one of the states of the collection document object and comprising data that indicates which transitions are valid for the at least one state and at least one rule for each valid transition, each of the at least one rules indicating which transitions will be valid if the transition corresponding to the rule is taken.

7. The apparatus of claim 1 wherein the collection document object is an accounts receivable collection document object that indicates that the debt is to be received by the bearer from the debtor.

8. The apparatus of claim 1 wherein the collection document object is an accounts payable collection document object that indicates that the debt is to be paid to the bearer by the debtor.

9. An apparatus comprising:

at least one processor;

a memory; and an operating system residing in the memory and supporting an application having an application interface layer and an underlying application functionality layer associated with the interface layer, wherein the functionality layer comprises an object-oriented environment comprising a framework that provides at least one collection document object that corresponds to and tracks a collection document, which is an unconditional order in writing as satisfaction of a debt in which a debtor promises to pay a bearer in exchange for at least one benefit that has been or will be received by the debtor, wherein the collection document object is instantiated from a class that inherits from a base class, the base class having at least one method or attribute that is common to both an accounts payable collection document object and an accounts receivable collection document object, wherein the accounts payable collection document object indicates that the debt is to be paid to the bearer by the debtor and the accounts receivable collection document object indicates that the debt is to be received by the bearer from the debtor.

10. A method for tracking collection documents, the method performed on a computer having an operating system and supporting an application having an application interface layer and an underlying application functionality layer associated with the interface layer, wherein the functionality layer comprises an object-oriented environment, the method comprising the steps of:

providing a framework within the functionality layer that comprises at least one collection document object that corresponds to and tracks a collection document, which is an unconditional order in writing in which a debtor promises to pay a debt to a bearer in exchange for at least one benefit that has been or will be received by the debtor;

tracking the collection document by transitioning the collection document object from a creation state into at least one intermediate state, each of the creation and intermediate states of the collection document object corresponding to a state of the collection document; and ending by transitioning into one of a plurality of ending states, each ending state of the collection document object corresponding to an ending state for the collection document.

11. The method of claim 10 wherein the collection document indicates that the debt is to be paid on a due date.

12. The method of claim 10 wherein the plurality of intermediate states comprise a state that indicates that the collection document has been sold to a bank but that the bearer retains risk of loss, a state that indicates if the collection document was sent to the bank for the bank to collect payment, a state that indicates that the debt is now due.

13. The method of claim 10 wherein the plurality of ending states comprise a state that indicates that the collection document was sold to a third party and that the bearer does not retain risk of loss, a state that indicates that at least a portion of the debt has been cancelled, a state that indicates that at least a portion of the debt has been written off, and a state that indicates that the debt has been paid.

14. The method of claim 10 wherein each of the states of the collection document object is connected to another state through a transition extension, each of the transition extensions causing its respective transition from a current state to a next state and wherein the method further comprises the step of removing previously defined transition extensions and adding any new transition extensions during a transition from a current state to a next state.

15. The method of claim 10 wherein each of the states of the collection document object is connected to another state through a transition, wherein the collection document object further comprises at least one table, the at least one table corresponding to at least one of the states of the collection document object and comprising data that indicates which transitions are valid for the at least one state and at least one rule for each valid transition, each of the at least one rules indicating which transitions will be valid if the transition corresponding to the rule is taken, and wherein the method further comprises the step of removing previously defined transitions and adding any new transitions according to the at least one rule associated with a transition from a current state to a next state.

16. The method of claim 10 wherein the collection document object is an accounts receivable collection document object that indicates that the debt is to be received by the bearer from the debtor.

17. The method of claim 10 wherein the collection document object is an accounts payable collection document object that indicates that the debt is to be paid to the bearer by the debtor.

18. The method of claim 10 wherein the collection document object is instantiated from a class that inherits from a base class, the base class having at least one method or attribute that is common to both an accounts payable collection document object and an accounts receivable collection document object, wherein the accounts payable collection document object indicates that the debt is to be paid to the bearer by the debtor and the accounts receivable collection document object indicates that the debt is to be received by the bearer from the debtor.

19. A program product, tangibly embodying a program of machine-readable instructions executable by a computer system having an operating system that supports an application having an application interface layer and an application functionality layer associated with the interface layer, wherein the functionality layer comprises an object-oriented program environment, the program product comprising:

an object-oriented framework within the functionality layer that provides at least one collection document object that corresponds to and tracks a collection document, which is an unconditional order in writing in which a debtor promises to pay a debt to a bearer in exchange for at least one benefit that has been or will be received by the debtor; and signal bearing media bearing the object-oriented framework, wherein the at least one collection document object has a life cycle that begins when the at least one collection document object is created in a creation state, that traverses at least one of a plurality of intermediate states and that ends at one of a plurality of ending states, each state of the collection document object corresponding to a state of the collection document, each state connected to at least one other state through at least one transition.

20. The program product of claim 19 wherein the signal bearing media comprises transmission media.

21. The program product of claim 19 wherein the signal bearing media comprises recordable media.

22. The program product of claim 19 wherein the collection document indicates that the debt is to be paid on a due date.

23. The program product of claim 19 wherein the plurality of intermediate states comprise a state that indicates that the collection document has been sold to a bank but that the bearer retains risk of loss, a state that indicates if the collection document was sent to the bank for the bank to collect payment, a state that indicates that the debt is now due.

24. The program product of claim 19 wherein the plurality of ending states comprise a state that indicates that the collection document was sold to a third party and that the bearer does not retain risk of loss, a state that indicates that at least a portion of the debt has been cancelled, a state that indicates that at least a portion of the debt has been written off, and a state that indicates that the debt has been paid.

25. The program product of claim 19 wherein each of the transitions is a transition extension that causes its respective transition from a current state to a next state and wherein previously defined transition extensions are removed and new transition extensions are added during respective transitions from a current state to a next state.

26. The program product of claim 19 wherein the collection document object further comprises at least one table, the at least one table corresponding to at least one of the states of the collection document object and comprising data that indicates which transitions are valid for the at least one state and at least one rule for each valid transition, each of the at least one rules indicating which transitions will be valid if the transition corresponding to the rule is taken.

27. The program product of claim 19 wherein the collection document object is an accounts receivable collection document object that indicates that the debt is to be received by the bearer from the debtor.

28. The program product of claim 19 wherein the collection document object is an accounts payable collection document object that indicates that the debt is to be paid to the bearer by the debtor.

29. A program product, tangibly embodying a program of machine-readable instructions executable by a computer system having an operating system that supports an application having an application interface layer and an application functionality layer associated with the interface layer, wherein the functionality layer comprises an object-oriented program environment, the program product comprising:

an object-oriented framework within the functionality layer that provides at least one collection document object that corresponds to and tracks a collection document, which is an unconditional order in writing in which a debtor promises to pay a debt to a bearer in exchange for at least one benefit that has been or will be received by the debtor; and signal bearing media bearing the object-oriented framework, wherein the collection document object is instantiated from a class that inherits from a base class, the base class having at least one method or attribute that is common to both an accounts payable collection document object and an accounts receivable collection document object, wherein the accounts payable collection document object indicates that the debt is to be paid to the bearer by the debtor and the accounts receivable collection document object indicates that the debt is to be received by the bearer from the debtor.

* * * * *